United States Patent
Fang et al.

(10) Patent No.: US 11,168,235 B2
(45) Date of Patent: Nov. 9, 2021

(54) ELECTRICALLY CONDUCTIVE ADHESIVE

(71) Applicant: 3M INNOVATIVE PROPERTIES COMPANY, St. Paul, MN (US)

(72) Inventors: Jing Fang, Shanghai (CN); Dong Yang, Shanghai (CN); Jeffrey W. McCutcheon, Baldwin, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/497,042

(22) PCT Filed: May 9, 2017

(86) PCT No.: PCT/CN2017/083574
§ 371 (c)(1),
(2) Date: Sep. 24, 2019

(87) PCT Pub. No.: WO2018/205127
PCT Pub. Date: Nov. 15, 2018

(65) Prior Publication Data
US 2020/0095479 A1    Mar. 26, 2020

(51) Int. Cl.
*H01B 1/22* (2006.01)
*C09J 9/00* (2006.01)
(Continued)

(52) U.S. Cl.
CPC .............. *C09J 9/02* (2013.01); *C09J 201/02* (2013.01); *H01B 1/22* (2013.01);
(Continued)

(58) Field of Classification Search
CPC ...... H01B 1/00; H01B 1/22; C09J 9/00; C09J 9/02
See application file for complete search history.

(56) References Cited

U.S. PATENT DOCUMENTS 4,568,592 A * 2/1986 Kawaguchi .......... H01R 12/714
                                              428/107
4,729,809 A * 3/1988 Dery ..................... H01B 1/20
                                              156/276
(Continued)

FOREIGN PATENT DOCUMENTS

CN      1307625       8/2001
CN    103201352       7/2013
(Continued)

OTHER PUBLICATIONS

Sancaktar et al "Thickness-dependent conduction behavior of various particles for conductive adhesive applications", J. Adhesion Sci. Technol., vol. 13, No. 7, pp. 763-771 (1999).*
(Continued)

*Primary Examiner* — Mark Kopec
(74) *Attorney, Agent, or Firm* — Clifton F. Richardson (57) ABSTRACT

An electrically conductive adhesive layer is described. The adhesive layer includes an adhesive material and pluralities of electrically conductive at least first and second particles. The adhesive layer may have a thickness less than about 35 micrometers and an electrical resistance in the thickness direction of less than about 30 milliohms. A total volume of the pluralities of particles may be greater than 40% of a total volume of the adhesive layer. The first and second particles may have different shapes.

16 Claims, 4 Drawing Sheets

(51) Int. Cl.
*C09J 9/02* (2006.01)
*C09J 201/02* (2006.01)

(52) U.S. Cl.
CPC .... *C09J 2301/302* (2020.08); *C09J 2301/312* (2020.08); *C09J 2301/314* (2020.08)

(56) References Cited

U.S. PATENT DOCUMENTS

| | | | |
|---|---|---|---|
| 6,297,564 | B1 | 10/2001 | Chung |
| 8,518,304 | B1 * | 8/2013 | Sammakia ............ H05K 3/323 |
| | | | 252/500 |
| 9,061,478 | B2 | 6/2015 | Choi |
| 9,153,354 | B2 | 10/2015 | Baran |
| 9,426,878 | B2 | 8/2016 | Choi |
| 10,785,900 | B2 * | 9/2020 | Ghosh ...................... H01B 1/20 |
| 2001/0008169 | A1 | 7/2001 | Connell |
| 2009/0311502 | A1 | 12/2009 | McCutcheon |
| 2012/0112136 | A1 * | 5/2012 | Kumakura ............ C09J 163/00 |
| | | | 252/513 |
| 2013/0323501 | A1 * | 12/2013 | Kristiansen ................ C09J 9/02 |
| | | | 428/327 |
| 2014/0162059 | A1 | 6/2014 | Wan |
| 2016/0319165 | A1 | 11/2016 | Choi |
| 2017/0058152 | A1 * | 3/2017 | Hardin ...................... C09J 9/02 |
| 2019/0359862 | A1 * | 11/2019 | Fang .......................... C09J 7/10 |

FOREIGN PATENT DOCUMENTS

| | | |
|---|---|---|
| CN | 105190373 | 12/2015 |
| CN | 105829472 | 8/2016 |
| WO | WO 2014-172913 | 10/2014 |

OTHER PUBLICATIONS

Qiao et al "Research on electrical conductive adhesives filled with mixed filler", International Journal of Adhesion & Adhesives 48 (2014) 159-163.*
Fuerhaupter, Potters Developmental Product, SC25D2OS, Silver-coated Copper, Sep. 19, 2012, 1 page.
Product Literature: Potters CONDUCT-O-FIL® Conductive Additives, Silver Coated Copper Flakes, Downloaded Apr. 9, 2017, 1 page.
Product Literature: TFM Series, Ag-plated Cu, Downloaded Apr. 9, 2017, 1 page.
International Search Report for PCT International Application No. PCT/CN2017/083574, dated Feb. 1, 2018, 4 pages.

* cited by examiner

ELECTRICALLY CONDUCTIVE ADHESIVE

BACKGROUND

Adhesives have been used for a variety of marking, holding, protecting, sealing and masking purposes. Adhesives may include electrically conductive particles in order to reduce the electrical resistance of the adhesive.

SUMMARY

In some aspects of the present description, an electrically conductive adhesive layer having an average thickness of less than about 15 micrometers and an electrical resistance in a thickness direction of less than about 30 milliohms is provided. The adhesive layer includes an adhesive material; and pluralities of electrically conductive at least first and second particles, where each first particle has a length L1, a width W1, and a thickness H1. L1 and W1 are each greater than about 5 H1 for at least a majority of the first particles. A ratio of a total volume of the pluralities of the at least first and second particles to a total volume of the adhesive layer greater than about 40%. The at least first and second particles are dispersed uniformly in the adhesive material such that for a majority of the first particles, the thickness direction of each first particle is substantially parallel to the thickness direction of the adhesive layer, and for a majority of the second particles, a maximum dimension of each second particle in the thickness direction of the adhesive layer is greater than about 5 H1.

In some aspects of the present description, an electrically conductive adhesive layer having an average thickness in a range from about 15 micrometers to about 35 micrometers, an electrical resistance in a thickness direction of less than about 30 milliohms, and a peel strength of at least 0.1 N/mm from a stainless steel surface after a dwell time of about 20 minutes at 22° C. is provided. The adhesive layer includes an adhesive material; a plurality of electrically conductive dendritic first particles dispersed in the adhesive material and having a cumulative 50% particle diameter D50 in a range from about 20 micrometers to about 40 micrometers; and a plurality of electrically conductive substantially planar second particles dispersed in the adhesive material and having a cumulative 50% particle diameter D50 in a range from about 40 micrometers to about 70 micrometers. A ratio of a total volume of the first and second particles to a total volume of the adhesive layer is in a range from about 15% to 60%.

In some aspects of the present description, an electrically conductive adhesive layer having an average thickness in a range from about 5 micrometers to about 35 micrometers is provided. The adhesive layer includes an adhesive material; a plurality of electrically conductive first particles dispersed in the adhesive material and having a first shape; and a plurality of electrically conductive second particles dispersed in the adhesive material and having a second shape different from the first shape. A ratio of a total weight of the first particles to a total weight of the second particles is in a range from about 2 to about 10. An electrical conductance of the adhesive layer in a thickness, but not in an in-plane, direction is at least 5% greater than a comparative adhesive layer having the same construction except that it does not include the second particles.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Adhesive layers of the present description include electrically conductive particles dispersed in an adhesive material. A wide variety of adhesive materials known in the art are useful in the adhesive layers of the present description. An adhesive material may be or include one or more of an acrylate, a methacrylate, an epoxy, a polyurethane, a polyester, a urethane, a polycarbonate, and a polysiloxane. An adhesive material may be or include one or more of a pressure sensitive adhesive, a hot melt adhesive, a thermoset adhesive, a thermoplastic adhesive, an ultraviolet (UV) adhesive, a liquid adhesive, a solvent based adhesive, and a water based adhesive. An adhesive material may include a tackifier for increasing the tack or stickiness of the adhesive. Suitable tackifiers include C5 hydrocarbons, C9 hydrocarbons, aliphatic resins, aromatic resins, terpenes, terpenoids, terpene phenolic resins, rosins, rosin esters, and combinations thereof.

An example of an adhesive is a pressure-sensitive adhesive. Pressure-sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure-sensitive adhesives are polymers designed and formulated to exhibit the requisite viscoelastic properties resulting in a desired balance of tack, peel adhesion, and shear holding power. Useful acrylic pressure sensitive adhesives are described in U.S. Pat. Appl. Pub. Nos. US 2009/0311501 (McCutcheon et al.) and US 2014/0162059 (Wan et al.) each of which is hereby incorporate herein by reference to the extent that it does not contradict the present description.

The adhesives of the present description may utilize pluralities of electrically conductive first and second particles, and optionally other particles, where the first and second particles are different. In some embodiments, one, but not the other, of the first and second particles has a thickness small compared to its length and width. For example, these particles may have a length and a width each greater than about 5 times, or greater than about 10 times, or even greater than about 20 times a thickness of the particle. In some embodiments, the other of the first and second particles have length to width, length to height and width to height aspect ratios each in a range from about 0.1 to about 10, or from about 0.2 to about 5, or from about ⅓ to about 3. It has been found that utilizing at least first and second particles where the first and second particles have different shapes, for example, allow an adhesive layer to made that is thin (e.g., less than about 35 micrometers, or less than about 15 micrometers), that has good peel strength (e.g., at least about 0.1 N/mm from stainless steel), and that has low electrical resistance (e.g., less than about 30 milliohms in the thickness direction of the adhesive layer).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Figure 1:
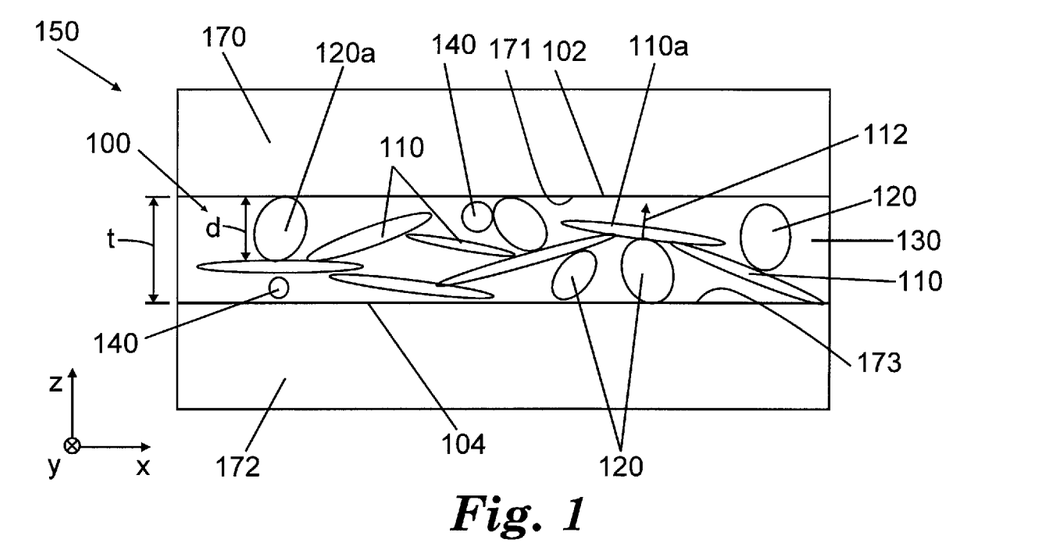
FIG. 1 is a schematic cross-sectional view of an article including an electrically conductive adhesive layer.

FIG. 1 is a schematic illustration of an article 150 including an electrically conductive adhesive layer 100 disposed between layers 170 and 172. Layers 170 and 172 may be adherends bonded through the adhesive layer 100, or one or both of layers 170 and 172 may be a release liner. In some embodiments, article 150 is an adhesive transfer tape and layer 170 is a first release liner releasably attached to a first major surface 102 of the adhesive layer 100. In some embodiments, layer 172 is a second release liner releasably attached to an opposite second major surface 104 of the adhesive layer 100. Any suitable release liner(s) may be used, such as, for example, a polyester (e.g., polyethylene terephthalate (PET)) film or a tape backing material (e.g., polyethylene coated paper). In embodiments where layers 170 and 172 are release liners, the major surfaces 171 and 173 of the layers 170 and 172, respectively, typically have a low surface energy so that adhesive layer 100 can be released from the layers 170 and 172. The low surface energy can be provided by a suitable surface treatment or coating as is known in the art. In some embodiments, the adhesive layer 100 has an average thickness t of less than about 35 micrometers, or less than about 25 micrometers, or less than about 15 micrometers, or less than about 14 micrometers, or less than about 13 micrometers, or less than about 12 micrometers, or less than about 11 micrometers, or less than about 10 micrometers. In some embodiments, the average thickness t is greater than about 1 micrometer, or greater than about 5 micrometers, or greater than about 10 micrometers, or greater than about 15 micrometers. In some embodiments, the average thickness t is in a range of about 5 micrometers to about 15 micrometers, or in a range of about 5 micrometers to about 35 micrometers, or in a range of about 15 micrometers to about 35 micrometers, for example.

Adhesive layer 100 includes an adhesive material 130, a plurality of particles 110 and a different plurality of particles 120, and optionally a plurality of particles 140 which are different from the particles 110 and 120. Particles 110, 120 and optionally 140 are electrically conductive. Plurality of particles 110 include particle 110a, for example, and plurality of particles 120 include particle 120a, for example. In some embodiments, each particle 110 has a length L1, a width W1, and a thickness H1, where L1 and W1 are each greater than about 5 H1 for at least a majority of the particle 110. In some embodiments, the particles 110 are elongated along the length direction of the particles 110. A particle having a length larger than twice its width and larger than twice is thickness may be described as elongated along the length of the particle. L1, W1 and H1 can take different values for different particles in the plurality of particles 110. The sizes of the particles may be distributed as described further elsewhere herein.

In some embodiments, the particles 110 and 120 are dispersed uniformly in the adhesive material 130 such that for a majority of the particles 110, the thickness direction 112 of each particle 110a is substantially parallel to the thickness direction (z-direction referring to the x-y-z coordinate system of FIG. 1) of the adhesive layer 100, and for a majority of the particles 120, a maximum dimension d of each particle 120a in the thickness direction of the adhesive layer 100 is greater than about 5 H1. For example, particles having lengths and widths large compared to thickness can be dispersed such that at least a majority of the particles have a thickness direction 112 substantially parallel to the thickness direction of the adhesive layer 100 during coating of the adhesive composition due to shear forces in the coating process which tend to align the particles. Substantially parallel can be understood to mean closer to parallel than to perpendicular. In some embodiments, an angle between the thickness direction 112 and the thickness direction of the adhesive layer 100 is less than 40 degrees for at least a majority of the particles 110, or for at least 75 percent, or for at least 90 percent of the particles 110. In some embodiments, an angle between the thickness direction 112 and the thickness direction of the adhesive layer 100 is less than 30 degrees for at least a majority of the particles 110, or for at least 75 percent, or for at least 90 percent of the particles 110.

In some embodiments, for a majority of the particles 120, or for at least 75% of the particles 120, the maximum dimension d of each particle 120a in the thickness direction (z-direction) of the adhesive layer 100 is greater than about 10 H1. In some embodiments, for at least 75% of the particles 120 or for at least 90% of the particles 120, the maximum dimension d of each particle 120a in the thickness direction (z-direction) of the adhesive layer 100 is greater than about 5 H1.

In some embodiments, the ratio of the total volume of the pluralities of particles 110, 120 and 140 (if included) to the total volume of the adhesive layer is greater than about 15%, or greater than about 25%, or greater than about 40%, or greater than about 45%, or greater than about 50%. Ratios may be expressed in terms of the equivalent percentage. For example, a ratio of 0.4 is equivalent to a ratio of 40%. In some embodiments, the ratio of the total volume of the pluralities particles 110, 120 and 140, if included, to the total volume of the adhesive layer is no more than about 75%, or no more than about 60%, or no more than about 45%. In some embodiments, a ratio of a total weight of the particles 110 to a total weight of the particles 120 is in a range from about 0.1 to about 10, or in a range of about 2 to about 10.

The adhesive layer may have a peel strength of at least 0.1 N/mm, or at least 0.2 N/mm, or at least 0.3 N/mm from a stainless steel surface after a dwell time of about 20 minutes at 22° C. The peel strength can be determined using a 180 degree peel test and a peel rate of 30.5 centimeters per minute can be used. For example, layer 172 may be a stainless steel layer and layer 170 may be a PET layer, for example, and the peel strength can be tested by peeling layer 170 and adhesive layer 100 from the surface 173 of the stainless steel layer 172. The peel can be carried out from the edge at small x which is pulled in the positive x-direction using an INSTRON (available from Illinois Tool Works Inc., Norwood, Mass.) or IMASS (available from IMASS, Inc., Accord, Mass.) testing system, for example, to maintain a constant peel rate (e.g., 30.5 centimeters per minute) and to measure the peel force. The peel strength can be determined according to the ASTM D3330/D3330M-04(2010) test standard.

Figure 2A:
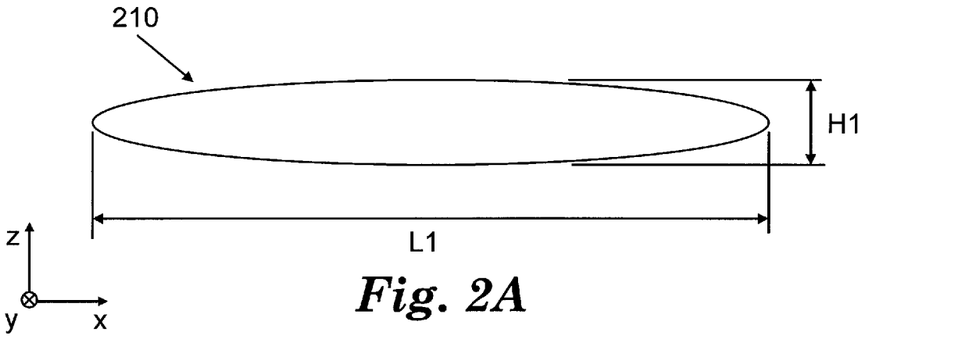
FIGS. 2A-2C are schematic cross-sectional views of a particle.
Figure 2B:
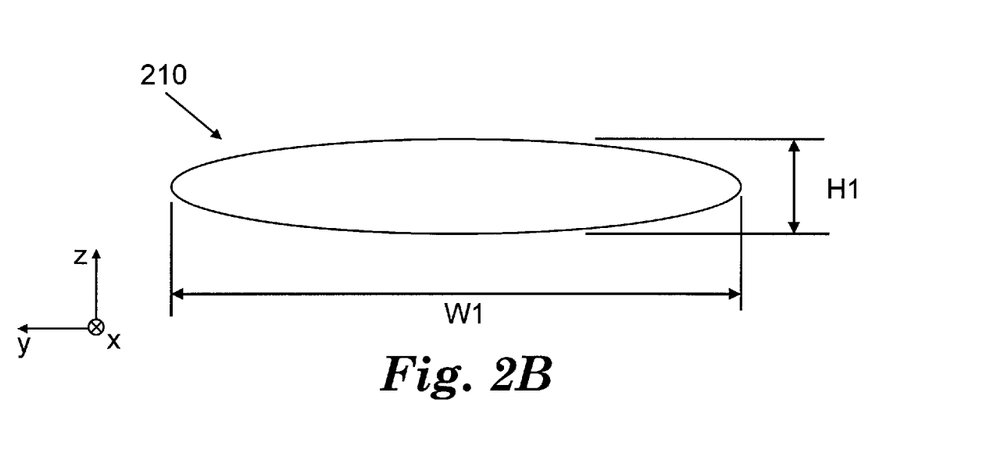
Figure 2C:
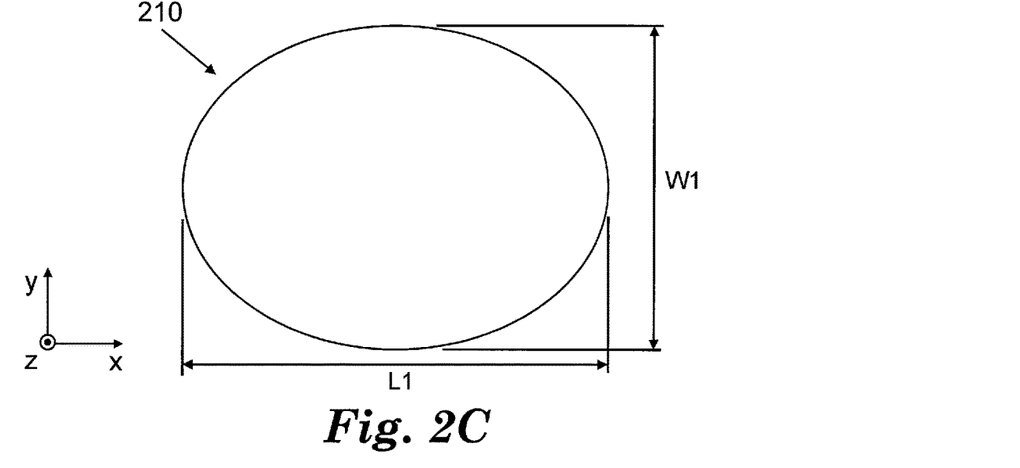

FIGS. 2A-2C are different cross sectional views of particle 210 which may correspond to a particle in the plurality of particles 110. Particle 210 has a length L1, a width W1 and a thickness H1. In some embodiments, L1 and W1 are each greater than about 5 H1, or about 10 H1. In some embodiments, a plurality of particles 210 are included in an adhesive layer and L1 and W1 are each greater than about 5 H1 for at least a majority of the particles, or for at least 75%, or for at least 90% of the particles. In some embodiments, a plurality of particles 210 are included in an adhesive layer and L1 and W1 are each greater than about 10 H1 for at least a majority of the particles, or for at least 75%, or for at least 90% of the particles.

Figure 3A:
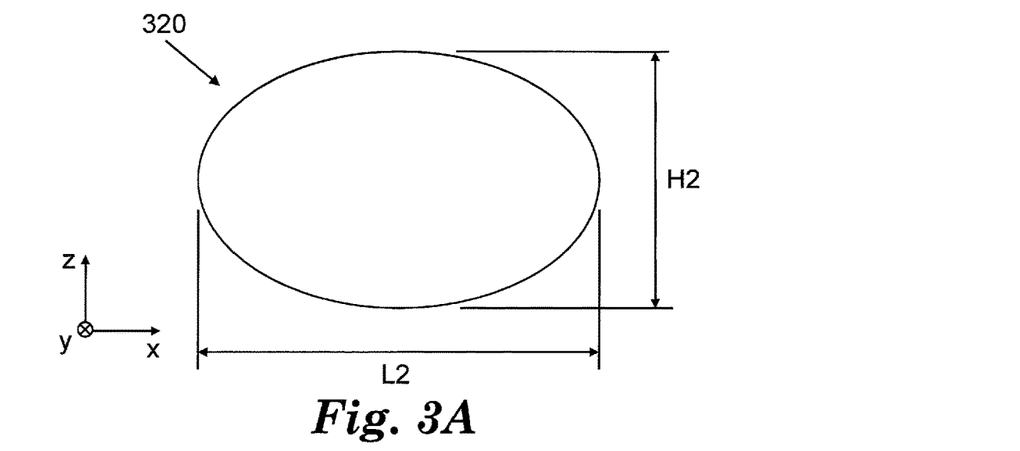
FIGS. 3A-3C are schematic cross-sectional views of a particle.
Figure 3B:
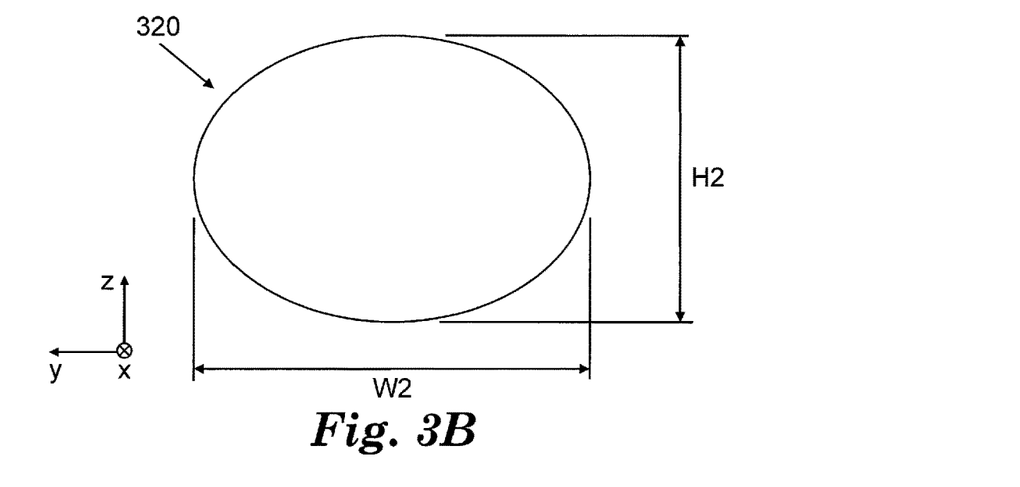
Figure 3C:
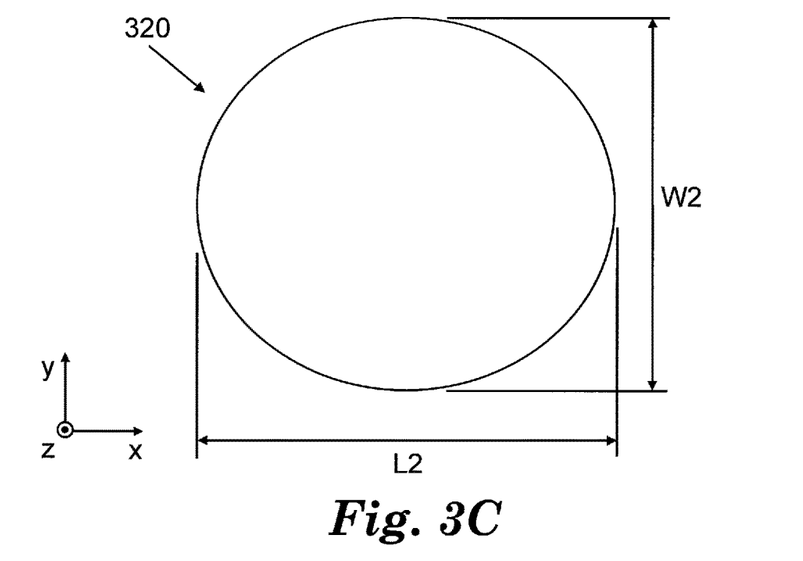

FIGS. 3A-3C are different cross sectional views of particle 320 which may correspond to a particle in the plurality of particles 120. Particle 320 has a length L2, a width W2 and a thickness H2. In some embodiments, each of L2/H2, W2/H2 and L2/W2 is in a range from about 0.1 to about 10, or from about 0.2 to about 5. In some embodiments, a plurality of particles 320 is included in an adhesive layer and L2/H2, W2/H2 and L2/W2 are each in a range from about 0.1 to about 10 for at least a majority of the particles, or for at least 75% of the particles, or for at least 90% of the particles. In some embodiments, a plurality of particles 320 is included in an adhesive layer and L2/H2, W2/H2 and L2/W2 are each in a range from about 0.2 to about 5 for at least a majority of the particles, or for at least 75% of the particles, or for at least 90% of the particles.

Figure 4:
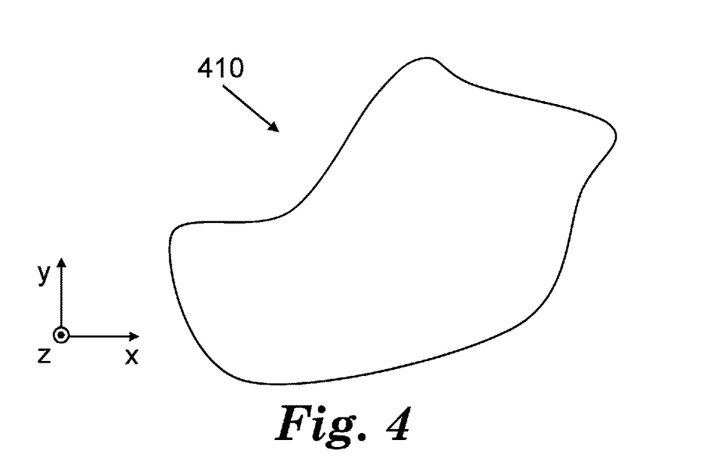
FIG. 4 is a schematic top view of s flake-like particle.

In some embodiments, for at least a majority of the particles 110, each of the particles are flake like particles, or plate like particles, or substantially planar particles, or substantially two-dimensional particles. Flake like particles include shards, wedges, and trapezoids, for example. Flake like particles can be substantially flat or can have a curved or irregular surface (e.g., like corn flakes). FIG. 4 is a schematic top view of a flake-like particle 410 having an irregular shape. Plate like particles are generally flat. For example, particle 210 may be described as plate like when H1 is small compared to L1 and W1. In this case, particle 210 may also be described as a substantially planar particle. In some embodiments, one of the first and second particles are substantially three-dimensional. Substantially three-dimensional particles are particles that have a length, width and thickness within a factor of 10 of each other. A substantially two-dimensional particle has a length and a width within a factor of 10 of each other and has a thickness less than one tenth of at least one of the length and the width. For example, particle 210 may be described as substantially two-dimensional if L1 and W1 are similar and L1 is greater than about 10 H1. Substantially two-dimensional particles can be curved or flat. Substantially two-dimensional particles typically include opposing major surfaces and the thickness of the particles is along a direction between the two major surfaces. The conductive particles included in the adhesive can also include conductive whiskers or conductive fibers and may be substantially one-dimensional. Substantially one-dimensional particles are particles that have a length at least 10 times each of a width and a thickness of the particle. Substantially one-dimensional particles can be straight or curved. The length of a curved substantially one-dimensional particle refers to the arc length along the curve of the particle. In some embodiments, the particles 110 are substantially two-dimensional particles and the particles 120 are substantially three-dimensional particles.

Figure 5:
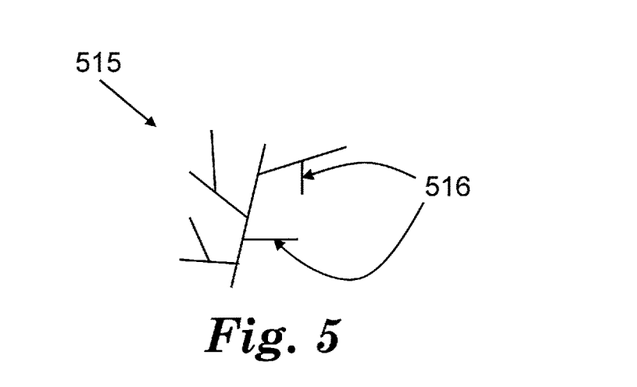
FIG. 5 is a schematic illustration of a dendritic particle.

Particles may be regular (e.g., spheres or ellipsoids or plates) or irregular (e.g., a particle may include at least one branch (e.g., a dendritic particle), or a particle may be an irregular flake). FIG. 5 is a schematic illustration of a dendritic particle 515 including a plurality of branches 516. Dendritic particles can be formed by crystal growth where the direction of growth bifurcates, for example, at a plurality of locations resulting a plurality branches. The branches can form substantially in a plane or a three-dimensional structure can be formed. In some embodiments, the particles 110 are substantially two-dimensional dendritic particles, and in some embodiments, the particles 120 are substantially three-dimensional dendritic particles. Suitable dendritic particles include the silver-coated copper dendritic particles available from Potters Industries, LLC (Valley Forge, Pa.) under the trade designation SC25D20S. Such particles may be used as particles 120 in the embodiment illustrated in FIG. 1, for example. In some embodiments, for at least a majority of the particles 120, each particle 120a comprises at least one branch. In some embodiments, for at least a majority of the particles 120, each particle 120a is a dendritic particle. In some embodiments, the plurality of electrically conductive particles 120 includes a plurality of dendritic particles.

The electrically conductive particles used in the adhesive of the present description may have a low density core material coated with an electrically conductive material. Polymeric flakes or beads, or glass or ceramic shards, for example, can be used as core particles. In other embodiments, hard particles can be used. Electrically conductive metals, mixtures and alloys thereof, for example, can be used on the surface of the particles, providing low electrical resistance while also having low density. Solid metals in numerous shapes, such as silver flakes or particles can also be used.

The electrically conductive particles used may be low density electrically conductive fillers, such as carbon particles, or fillers of low density material such as polyethylene, polystyrene, phenol resin, epoxy resin, acryl resin, glass particles, glass shards, silica, graphite, or ceramic, prepared with a surface covering or coating of a metal such as silver, copper, nickel, gold, tin, zinc, platinum, palladium, iron, tungsten, molybdenum, alloys thereof, or solder, for example. The conductive coating on the particles may comprise from about 5 to about 45 weight percent (wt. %) of the total weight of the coating plus the base particle. The electrically conductive particles used also may be particles having a hard and/or sharp core, hard enough or sharp enough to penetrate an oxide or other surface layer on the intended substrate to improve electrical conductivity. For example, steel or stainless steel particles can be used. Coatings with conductivity greater than the core particle also can be used on otherwise conductive core particles.

Any of the particles described herein (e.g., particles 110 and/or 120) may include copper particles coated with silver. Suitable silver coated copper particles include those available from Potters Industries, LLC (Valley Forge, Pa.) under the trade designation CONDUCT-O-FIL and those available from Toyo Aluminum K.K. (Japan).

Figure 6:
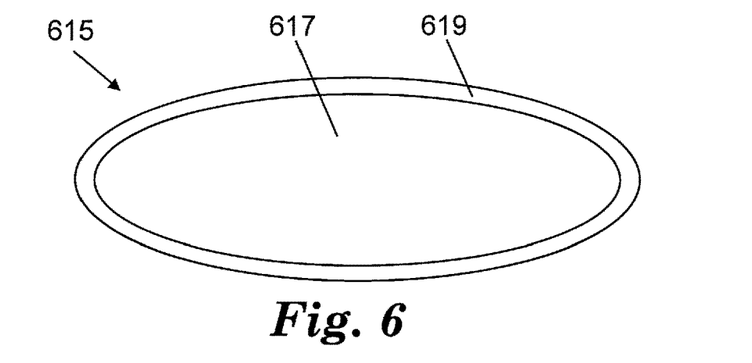
FIG. 6 is a schematic illustration of a coated particle.

FIG. 6 is a schematic cross sectional view of an electrically conductive particle 615, which may correspond to a particle 110 or 120, and which includes a core 617 and an electrically conductive coating 619. In some embodiments, the core 617 can be any material described elsewhere herein and the coating 619 can be any conductive coating described elsewhere herein. For example, in some embodiments, particle 615 is a copper particle (core 617 is copper) coated with silver (coating 619 is silver).

Figure 7:
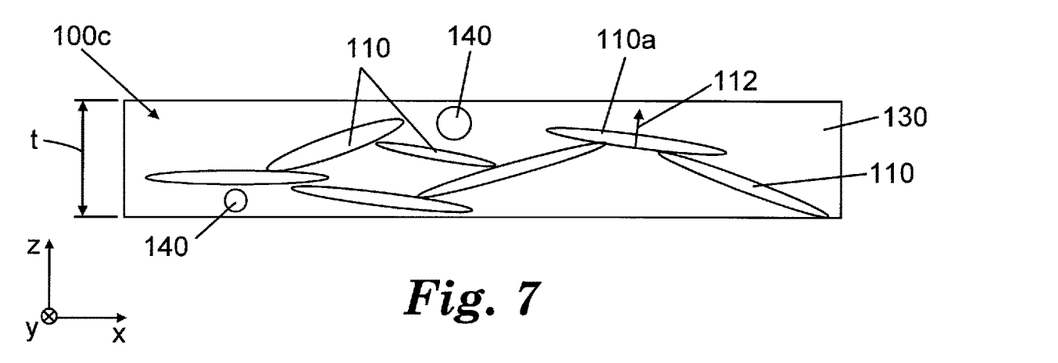
FIG. 7 is a schematic cross-sectional view of a comparative adhesive layer.

The adhesive layer 100 may have an electrical resistance in the thickness direction of less than about 30 milliohms, or less than about 20 milliohms. In some embodiments, the adhesive layer 100 is more electrically conductive in the thickness direction (z-direction) and less electrically conductive in an in-plane direction (x- or y-direction). In some embodiments, the electrical conductivity in the in-plane directions are provided primarily by conductive particles 110, and in some embodiments, the electrical conductivity in the thickness direction is provided primarily by conductive particles 120. FIG. 7 is a schematic cross-sectional view of comparative adhesive layer 100c which has the same construction as adhesive layer 100 except that it does not include the particles 120. In some embodiments, the conductance of the adhesive layer 100 in the thickness direction is significantly higher than the conductance of comparative adhesive layer 100c in the thickness direction, but the in-plane conductance of the adhesive layer 100 is similar to the in-plane conductance of the comparative adhesive layer 100c. For example, in some embodiments, the conductance of the adhesive layer 100 is at least 5% greater than the conductance of the comparative adhesive layer 100c in the thickness direction, but the conductance of the adhesive layer 100 is not at least 5% greater than the conductance of the comparative adhesive layer 100c in one or both of the in-plane directions. In some embodiments, the conductance of the adhesive layer 100 in the thickness direction is at least 10% or at least 20% greater than the conductance of adhesive layer 100c in the thickness direction. In some embodiments, the conductance of the adhesive layer 100 in an in-plane direction is no more than 3% greater, or no more than 4% greater, or no more than 5% greater than the conductance of comparative adhesive layer 100c in the in-plane direction.

Figure 8:
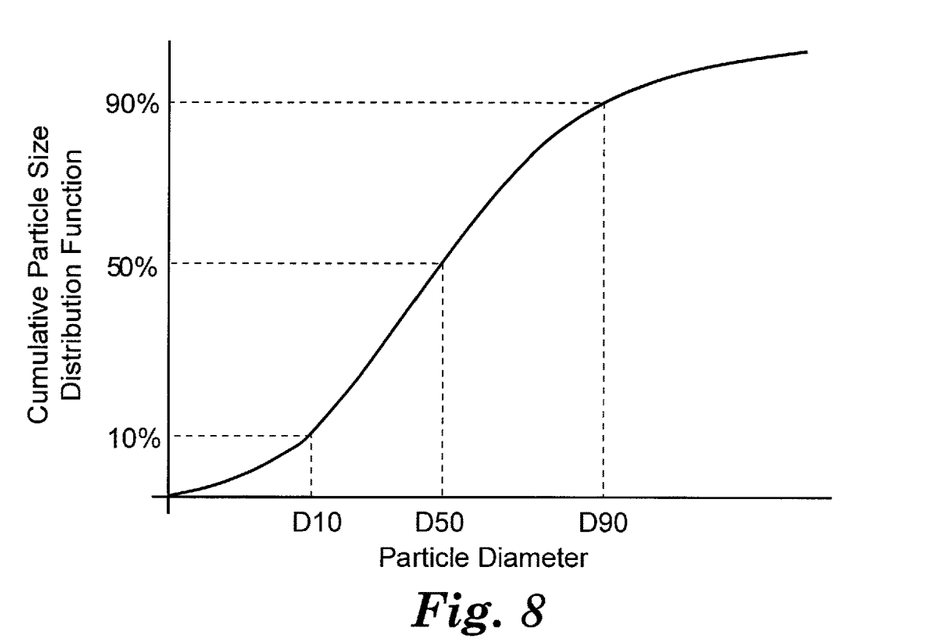
FIG. 8 schematically illustrates a cumulative particle size distribution function.

The particles 110 and/or the particles 120 may have a distribution of particle sizes. The size distribution may be usefully characterized in terms of the quantities D10, D50 and D90 which are the cumulative 10% particle diameter, the cumulative 50% particle diameter, and the cumulative 90% particle diameter, respectively. These quantities can be determined by sieve analysis as is common in the art. The particle diameter in this context refers to the nominal sieve opening size that will allow the particle to pass through. D10, D50 and D90 are the nominal sieve opening sizes where 10%, 50% and 90%, respectively, by weight of the particles will pass through the sieve openings. FIG. 8 schematically illustrates a cumulative particle size distribution function showing D10, D50 and D90 where the distribution function has the values 10%, 50% and 90%, respectively. In some embodiments, one or both of the pluralities of particles 110 and 120 have a cumulative 10% particle diameter D10 in a range from about 1 micrometers to about 20 micrometers. In some embodiments, one or both of the pluralities of particles 110 and 120 have a cumulative 50% particle diameter D50 in a range from about 5 micrometers to about 80 micrometers. In some embodiments, one or both of the pluralities of particles 110 and 120 have a cumulative 90% particle diameter D90 in a range from about 10 micrometers to about 80 micrometers. In some embodiments, the particles 120, which may be electrically conducive dendritic particles for example, have a cumulative 50% particle diameter D50 in a range from about 20 micrometers, or about 25 micrometers, to about 40 micrometers, or to about 35 micrometers. In some embodiments, the particles 110, which may be substantially planar particles for example, have a cumulative 50% particle diameter D50 in a range from about 40 micrometers to about 70 micrometers, or to about 55 micrometers.

The following is a list of exemplary embodiments of the present description.

Embodiment 1 is an electrically conductive adhesive layer having an average thickness of less than about 15 micrometers and an electrical resistance in a thickness direction of less than about 30 milliohms, the adhesive layer comprising:

an adhesive material;

pluralities of electrically conductive at least first and second particles, each first particle having a length L1, a width W1, and a thickness H1, L1 and W1 each greater than about 5 H1 for at least a majority of the first particles, a ratio of a total volume of the pluralities of the at least first and second particles to a total volume of the adhesive layer greater than about 40%, the at least first and second particles dispersed uniformly in the adhesive material such that for a majority of the first particles, the thickness direction of each first particle is substantially parallel to the thickness direction of the adhesive layer, and for a majority of the second particles, a maximum dimension of each second particle in the thickness direction of the adhesive layer is greater than about 5 H1.

Embodiment 2 is the electrically conductive adhesive layer of Embodiment 1, wherein the pluralities of electrically conductive at least first and second particles comprises a plurality of third particles, each third particle different from the first and second particles.

Embodiment 3 is the electrically conductive adhesive layer of Embodiment 1 having an average thickness of less than about 14 micrometers.

Embodiment 4 is the electrically conductive adhesive layer of Embodiment 1 having an average thickness of less than about 13 micrometers.

Embodiment 5 is the electrically conductive adhesive layer of Embodiment 1 having an average thickness of less than about 12 micrometers.

Embodiment 6 is the electrically conductive adhesive layer of Embodiment 1 having an average thickness of less than about 11 micrometers.

Embodiment 7 is the electrically conductive adhesive layer of Embodiment 1 having an average thickness of less than about 10 micrometers.

Embodiment 8 is the electrically conductive adhesive layer of Embodiment 1 being more electrically conductive in the thickness direction and less electrically conductive in an in-plane direction.

Embodiment 9 is the electrically conductive adhesive layer of Embodiment 1, wherein L1 and W1 are each greater than about 5 H1 for at least 75% of the first particles.

Embodiment 10 is the electrically conductive adhesive layer of Embodiment 1, wherein L1 and W1 are each greater than about 5 H1 for at least 90% of the first particles.

Embodiment 11 is the electrically conductive adhesive layer of Embodiment 1, wherein L1 and W1 are each greater than about 10 H1 for at least a majority of the first particles.

Embodiment 12 is the electrically conductive adhesive layer of Embodiment 1, wherein the ratio of the total volume of the pluralities of the at least first and second particles to the total volume of the adhesive layer is greater than about 45%.

Embodiment 13 is the electrically conductive adhesive layer of Embodiment 1, wherein the ratio of the total volume of the pluralities of the at least first and second particles to the total volume of the adhesive layer is about 50%.

Embodiment 14 is the electrically conductive adhesive layer of Embodiment 1, wherein for at least 75% of the first particles, the thickness direction of each first particle is substantially parallel to the thickness direction of the adhesive layer.

Embodiment 15 is the electrically conductive adhesive layer of Embodiment 1, wherein for at least 90% of the first particles, the thickness direction of each first particle is substantially parallel to the thickness direction of the adhesive layer.

Embodiment 16 is the electrically conductive adhesive layer of Embodiment 1, wherein for a majority of the second particles, the maximum dimension of each second particle in the thickness direction of the adhesive layer is greater than about 10 H1.

Embodiment 17 is the electrically conductive adhesive layer of Embodiment 1, wherein for at least 75% of the second particles, the maximum dimension of each second particle in the thickness direction of the adhesive layer is greater than about 5 H1.

Embodiment 18 is the electrically conductive adhesive layer of Embodiment 1, wherein for at least 90% of the second particles, the maximum dimension of each second particle in the thickness direction of the adhesive layer is greater than about 5 H1.

Embodiment 19 is the electrically conductive adhesive layer of Embodiment 1, wherein each second particle has a length L2, a width W2, and a thickness H2, L2/H2, W2/H2 and L2/W2 each in a range from about 0.1 to about 10 for at least a majority of the second particles.

Embodiment 20 is the electrically conductive adhesive layer of Embodiment 1, wherein for at least a majority of the first particles, each first particle is flake like.

Embodiment 21 is the electrically conductive adhesive layer of Embodiment 1, wherein for at least a majority of the first particles, each first particle is plate like.

Embodiment 22 is the electrically conductive adhesive layer of Embodiment 1, wherein for at least a majority of the second particles, each second particle comprises at least one branch.

Embodiment 23 is the electrically conductive adhesive layer of Embodiment 1, wherein for at least a majority of the second particles, each second particle is a dendritic particle.

Embodiment 24 is the electrically conductive adhesive layer of Embodiment 1, wherein the plurality of electrically conductive second particles comprises a plurality of dendritic particles.

Embodiment 25 is the electrically conductive adhesive layer of Embodiment 1, wherein the first particles are substantially two-dimensional particles and the second particles are substantially three-dimensional particles.

Embodiment 26 is the electrically conductive adhesive layer of Embodiment 1, wherein a ratio of a total weight of the first particles to a total weight of the second particles is in a range from about 0.1 to about 10.

Embodiment 27 is the electrically conductive adhesive layer of Embodiment 1 having a peel strength of at least 0.1 N/mm from a stainless steel surface after a dwell time of about 20 minutes at 22° C.

Embodiment 28 is the electrically conductive adhesive layer of Embodiment 1 having a peel strength of at least 0.2 N/mm from a stainless steel surface after a dwell time of about 20 minutes at 22° C.

Embodiment 29 is the electrically conductive adhesive layer of Embodiment 1 having a peel strength of at least 0.3 N/mm from a stainless steel surface after a dwell time of about 20 minutes at 22° C.

Embodiment 30 is the electrically conductive adhesive layer of Embodiment 1, wherein the adhesive material comprises one or more of a pressure sensitive adhesive, a hot melt adhesive, a thermoset adhesive, a thermoplastic adhesive, a UV adhesive, a liquid adhesive, a solvent based adhesive, and a water based adhesive.

Embodiment 31 is the electrically conductive adhesive layer of Embodiment 1, wherein the adhesive material comprises one or more of an acrylate, a methacrylate, an epoxy, a polyurethane, a polyester, a urethane, a polycarbonate, and polysiloxane.

Embodiment 32 is the electrically conductive adhesive layer of Embodiment 31, wherein the adhesive material further comprises a tackifier.

Embodiment 33 is the electrically conductive adhesive layer of Embodiment 32, wherein the tackifier is selected from the group consisting of C5 hydrocarbons, C9 hydrocarbons, aliphatic resins, aromatic resins, terpenes, terpenoids, terpene phenolic resins, rosins, rosin esters, and combinations thereof.

Embodiment 34 is the electrically conductive adhesive layer of Embodiment 1, wherein the first particles comprise copper particles coated with silver.

Embodiment 35 is the electrically conductive adhesive layer of Embodiment 1, wherein the first particles have a cumulative 10% particle diameter D10 in a range from about 1 micrometer to about 20 micrometers.

Embodiment 36 is the electrically conductive adhesive layer of Embodiment 1, wherein the first particles have a cumulative 50% particle diameter D50 in a range from about 5 micrometers to about 50 micrometers.

Embodiment 37 is the electrically conductive adhesive layer of Embodiment 1, wherein the first particles have a cumulative 90% particle diameter D90 in a range from about 10 micrometers to about 80 micrometers.

Embodiment 38 is the electrically conductive adhesive layer of Embodiment 1, wherein the first particles are elongated along the length direction of the first particles.

Embodiment 39 is the electrically conductive adhesive layer of Embodiment 1, wherein the second particles comprise copper particles coated with silver.

Embodiment 40 is the electrically conductive adhesive layer of Embodiment 1, wherein the second particles have a cumulative 10% particle diameter D10 in a range from about 1 micrometer to about 20 micrometers.

Embodiment 41 is the electrically conductive adhesive layer of Embodiment 1, wherein the second particles have a cumulative 50% particle diameter D50 in a range from about 5 micrometers to about 50 micrometers.

Embodiment 42 is the electrically conductive adhesive layer of Embodiment 1, wherein the second particles have a cumulative 90% particle diameter D90 in a range from about 10 micrometers to about 80 micrometers.

Embodiment 43 is an adhesive transfer tape comprising:
the electrically conductive adhesive layer of any one of Embodiments 1 to 42; and
a first release liner releasably attached to a first major surface of the adhesive layer.

Embodiment 44 is the adhesive transfer tape of Embodiment 43, wherein the first release liner comprises a polyethylene coated paper.

Embodiment 45 is the adhesive transfer tape of Embodiment 43, wherein the first release liner comprises polyester terephthalate (PET).

Embodiment 46 is the adhesive transfer tape of Embodiment 43 further comprising a second release liner releasably attached to an opposite second major surface of the adhesive layer.

Embodiment 47 is the electrically conductive adhesive layer of Embodiment 1, wherein an electrical conductance of the adhesive layer in a thickness, but not in an in-plane, direction is at least 5% greater than a comparative adhesive layer having the same construction except that it does not include the second particles.

Embodiment 48 is an electrically conductive adhesive layer comprising:
an adhesive material;
a plurality of electrically conductive dendritic first particles dispersed in the adhesive material and having a cumulative 50% particle diameter D50 in a range from about 20 micrometers to about 40 micrometers; and
a plurality of electrically conductive substantially planar second particles dispersed in the adhesive material and having a cumulative 50% particle diameter D50 in a range from about 40 micrometers to about 70 micrometers, a ratio of a total volume of the first and second particles to a
total volume of the adhesive layer in a range from about 15% to 60%, the adhesive layer having an average thickness in a range from about 15 micrometers to about 35 micrometers, an electrical resistance in a thickness direction of less than about 30 milliohms, and a peel strength of at least 0.1 N/mm from a stainless steel surface after a dwell time of about 20 minutes at 22° C.

Embodiment 49 is the electrically conducting adhesive layer of Embodiment 48, wherein each second particle has a length, a width and a thickness such that the length and the width are greater than about 10 times the thickness for at least a majority of the second particles.

Embodiment 50 is the electrically conductive adhesive layer of Embodiment 48, wherein each first particle is substantially three-dimensional.

Embodiment 51 is the electrically conductive adhesive layer of Embodiment 48, wherein an electrical conductance of the adhesive layer in a thickness, but not in an in-plane, direction is at least 5% greater than a comparative adhesive layer having the same construction except that it does not include the first particles.

Embodiment 52 is the electrically conductive adhesive layer of Embodiment 48, wherein the peel strength is at least 0.2 N/mm.

Embodiment 53 is the electrically conductive adhesive layer of Embodiment 48, wherein the peel strength is at least 0.3 N/mm.

Embodiment 54 is an adhesive transfer tape comprising:
the electrically conductive adhesive layer of any one of Embodiments 48 to 53; and
a first release liner releasably attached to a first major surface of the adhesive layer.

Embodiment 55 is an electrically conductive adhesive layer comprising:
an adhesive material;
a plurality of electrically conductive first particles dispersed in the adhesive material and having a first shape;
a plurality of electrically conductive second particles dispersed in the adhesive material and having a second shape different from the first shape, a ratio of a total weight of the first particles to a total weight of the second particles in a range from about 2 to about 10, the adhesive layer having an average thickness in a range from about 5 micrometers to about 35 micrometers, such that an electrical conductance of the adhesive layer in a thickness, but not in an in-plane, direction is at least 5% greater than a comparative adhesive layer having the same construction except that it does not include the second particles.

Embodiment 56 is the electrically conductive adhesive layer of Embodiment 55, wherein the first particles are flake like and the second particles are dendritic particles.

Embodiment 57 is the electrically conductive adhesive layer of Embodiment 55, wherein the first particles are plate like and the second particles are dendritic particles.

Embodiment 58 is the electrically conductive adhesive layer of Embodiment 55 having an electrical resistance in the thickness direction of less than about 30 milliohms.

Embodiment 59 is the electrically conductive adhesive layer of any one of Embodiments 55 to 58 having a peel strength of at least 0.1 N/mm from a stainless steel surface after a dwell time of about 20 minutes at 22° C.

Embodiment 60 is the electrically conductive adhesive layer of any one of Embodiments 55 to 58 having a peel strength of at least 0.2 N/mm from a stainless steel surface after a dwell time of about 20 minutes at 22° C.

Embodiment 61 is the electrically conductive adhesive layer of any one of Embodiments 55 to 58 having a peel strength of at least 0.3 N/mm from a stainless steel surface after a dwell time of about 20 minutes at 22° C.

Embodiment 62 is the electrically conductive adhesive layer of any one of Embodiments 55 to 61, wherein the electrical conductance of the adhesive layer in a thickness direction is at least 10% greater than that of the comparative adhesive layer.

Embodiment 63 is the electrically conductive adhesive layer of any one of Embodiments 55 to 61, wherein the electrical conductance of the adhesive layer in a thickness direction is at least 20% greater than that of the comparative adhesive layer.

Embodiment 64 is the electrically conductive adhesive layer of any one of Embodiments 55 to 63, wherein the electrical conductance of the adhesive layer in the in-plane direction is no more than 4% greater than that of the comparative adhesive layer.

Embodiment 65 is the electrically conductive adhesive layer of any one of Embodiments 55 to 63, wherein the electrical conductance of the adhesive layer in the in-plane direction is no more than 3% greater than that of the comparative adhesive layer.

Embodiment 66 is an adhesive transfer tape comprising:
the electrically conductive adhesive layer of any one of Embodiments 55 to 65; and
a first release liner releasably attached to a first major surface of the adhesive layer.

EXAMPLES

Where not otherwise specified, materials were available from chemical supply houses, such as Aldrich, Milwaukee, Wis. Amounts are in parts by weight unless otherwise indicated.

Materials

| Trade Name or Identifier | Description | Avialable from |
|---|---|---|
| Adhesive 1 | Acrylic solvent based adhesive | Prepared by mixing an acrylic polymer in ethyl acetate solvent to 30 wt % to provide an intrinsic viscosity of at least 1.0. |
| TP2040 | Terpene resin | Arizona Chemical (Jacksonville, FL) |
| SC230F9.5 | Silver coated copper flake | Potters Industries, LLC (Valley Forge, PA) |
| SC25D20S | Silver coated copper particle | Potters Industries, LLC (Valley Forge, PA) |
| TFM-C15F | Silver coated copper flake | Toyo Aluminium K.K. (Japan) |
| TFM-C05F | Silver coated copper flake | Toyo Aluminium K.K. (Japan) |
| TFM-C05P | Silver coated copper particle | Toyo Aluminium K.K. (Japan) |
| TFM-C02P | Silver coated copper particle | Toyo Aluminium K.K. (Japan) |
| TFM-S05P | Silver coated silica particle | Toyo Aluminium K.K. (Japan) |
| RD1054 | Bisamide type crosslinker | 3M Company (St. Paul, MN) |
| Ethyl Acetate | Solvent | Peixing Chemical (China) |
| 120 g BKA C1S PCK Liner | Polycoated Kraft Paper (PCK) liner | Loparex Guangzhou Naiheng Ltd. (China) |
| SILPHAN S 50 M 3J13018 Clear | PET liner | Siliconature Co. (UK) |

Test Methods

Resistance Test

The electrical resistance in the thickness direction of an adhesive layer was measured by cutting a tape containing the adhesive layer into two 10 mm×10 mm pieces and placing the pieces on the center of two spaced apart gold plated copper electrodes of a first test board. After initial hand lamination and removal of the liners, a second test board having a gold plated copper side was placed with the gold side down on the tape pieces with the board extending between the two tape pieces, and a 2 kg rubber roller was applied cross the first test board. After 20 minutes of dwell time at room temperature (about 22° C.), the direct current (DC) resistance between the electrodes was measured with a micro-ohm meter. The resistance was also measured at longer dwell times.

The in-plane electrical resistance was measured by cutting a tape containing the adhesive layer into a 5 mm×50 mm piece and placing the piece on an array of electrodes having a 300 micrometer width and a 200 micrometer spacing between adjacent electrodes in a second test board. A 2 kg rubber roller was then applied cross the second test board. After 20 minutes of dwell time at room temperature (about 22° C.), the direct current (DC) resistance between adjacent electrodes was measured with a micro-ohm meter.

Peel Force Test

An adhesive film sample was laminated, with a one inch rubber roller and hand pressure of about 0.35 kilograms per square centimeter, to a 50 μm thick polyethylene terephthalate (PET) film. A one inch (25.4 cm) wide strip was cut from the adhesive film/PET laminate. This adhesive film side of the test strip was laminated, with a two kilogram rubber roller, to a stainless steel plate which had been cleaned by wiping it once with acetone and three times with heptane. The laminated test sample was allowed to remain at ambient conditions (about 22° C.) for about 20 minutes. The adhesive film sample/PET test sample was removed from the stainless steel surface at an angle of 180 degrees at a rate of 30.5 centimeters per minute. The force was measured with an IMASS Model SP-2000 tester (IMASS, Inc., Accord, Va.).

Preparation of Semi-Adhesive A 100 grams of Adhesive 1, 8.50 grams of TP2040 and 74.5 grams of Ethyl Acetate were mixed together to provide Semi-Adhesive A, which was an adhesive formulation having 21 percent solids.

Comparative Examples C1-C3

Comparative Examples C1-C3 were 3M 9707 electrically conductive adhesive transfer tape, 3M 9725 electrically conductive double coated nonwoven tape, and 3M 7751 electrically conductive adhesive transfer tape, respectively, all available from 3M Company (St. Paul, Minn.).

Examples 1-6

The formulations according to the following table were prepared:

|  | Examples 1-3 | Example 4 | Examples 5 and 6 |
|---|---|---|---|
| Semi-Adhesive A | 30 | 30 | 30 |
| SC25D20S | 0.5 | 0.5 | 0.5 |
| SC230F9.5 | 1.0 | 3.0 | 5.0 |
| RD1054 | 0.05 | 0.05 | 0.05 |

The formulations were coated using a comma bar with a blade gap set to a desired thickness to coat the adhesive layers onto PET liners. The adhesive layers were dried in an oven at 110° C. for 10 minutes. The thicknesses of the dried adhesive layers was measured using a digital thickness tester (Model 547-301 from Mitutoyo (Japan)). A PCK liner was laminated to the dried adhesive liner.

In Examples 1-3, the weight percent of SC25D2OS in the dry adhesive layer was 6.4%; in Example 4, it was 5.1%; and in Examples 5-6 it was 4.6%. In Examples 1-3, the weight percent of SC230F9.5 in the dry adhesive layer was 12.8%; in Example 4, it was 30.6%; and in Examples 5-6, it was 47%.

Peel strength was measured with the open side (side with PCK liner) bonded to the steel surface and with the back side (side with PET liner) bonded to the steel surface. Resistance in the thickness direction was measured at various dwell times including a 20 minute dwell time at room temperature (denoted "Resistance" in the table below) and with a dwell time of about 1 week at room temperature (denoted "Resistance after 1 week" in the table below). The results are provided in the table below:

| Example | Thickness (micrometers) | Peel strength (N/mm), open side | Peel strength (N/mm), back side | Resistance (milliohm) | Resistance after 1 week (milliohm) |
| --- | --- | --- | --- | --- | --- |
| 1 | 17 | 0.4 | 0.7 | 22.0 | 23.8 |
| 2 | 20 | 0.6 | 0.8 | 21.2 | 24.8 |
| 3 | 25 | 0.8 | 0.8 | 29.7 | 27.7 |
| 4 | 22 | 0.4 | 0.6 | 15.8 | 14.2 |
| 5 | 20 | 0.2 | 0.1 | 13.2 | 11.2 |
| 6 | 30 | 0.2 | 0.1 | 13.0 | 12.0 |
| C1 | 50 | 0.7 | 0.7 | 26.8 | 18.8 |
| C2 | 60 | 0.5 | 0.7 | 32.8 | 35.6 |
| C3 | 40 | 0.7 | 0.7 | 105.4 | 51.0 |

Examples 7-12 and Comparative Example C4-C6

The formulations for Comparative Examples C4-C6 were prepared by mixing together 15 grams of Semi-Adhesive A, 0.02 grams of RD1054, and 1.75 grams of SC230F9.5 (Comparative Example C4) or 1.75 grams of TFM-C15F (Comparative Example C5) or 1.75 grams of TFM-C05F (Comparative Example C6). The formulations for Examples 7-12 were prepared according to the weights in grams in the following table:

| | Ex. 7 | Ex. 8 | Ex. 9 | Ex. 10 | Ex. 11 | Ex. 12 |
| --- | --- | --- | --- | --- | --- | --- |
| Semi-Adhesive A | 15.0 | 15.0 | 15.0 | 15.0 | 15.0 | 15.0 |
| SC230F9.5 | 1.50 | | | 1.50 | 1.50 | 1.50 |
| TFM-C15F | | 1.50 | | | | |
| TFM-C05F | | | 1.50 | | | |
| SC25D20S | 0.25 | 0.25 | 0.25 | | | |
| TFM-C05P | | | | 0.25 | | |
| TFM-C02P | | | | | 0.25 | |
| TFM-S05P | | | | | | 0.25 |
| RD1054 | 0.02 | 0.02 | 0.02 | 0.02 | 0.02 | 0.02 |

Samples were prepared and tested as in Example 1. Each of Examples 7-12 and Comparative Example C4-C6 had a thickness of about 10 micrometers. The results of peel strength and resistance (no dwell and 1 week dwell) are given in the following table.

| Example | Peel strength (N/mm), open side | Peel strength (N/mm), back side | Resistance (milliohm) | Resistance after 1 week (milliohm) |
| --- | --- | --- | --- | --- |
| 7 | 0.36 | 0.26 | 11.6 | 21.0 |
| 8 | 0.52 | 0.48 | 11.0 | 14.0 |
| 9 | 0.63 | 0.62 | 11.3 | 16.0 |
| 10 | 0.08 | 0.14 | 11.8 | 13.8 |
| 11 | 0.12 | 0.14 | 13.2 | 15.6 |
| 12 | 0.06 | 0.08 | 17.0 | 22.5 |
| C4 | 0.13 | 0.15 | 13.5 | 19.7 |
| C5 | 0.56 | 0.48 | 517.3 | 470.3 |
| C6 | 0.49 | 0.48 | 621.3 | 1124.6 |

The in-plane resistance was determined as described under "Resistance Test". For each of Examples, 1-4 and 7-10, the in-plane resistance was greater than 20 kilioohm. For examples, 5 and 6, the in-plane resistance was 197 ohm and 383 ohm, respectively.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An electrically conductive adhesive layer having an average thickness of less than about 15 micrometers and an electrical resistance in a thickness direction of less than about 30 milliohms, the adhesive layer comprising:
    an adhesive material;
    pluralities of electrically conductive at least first and second particles, each first particle having a length L1, a width W1, and a thickness H1, L1 and W1 each greater than about 5 H1 for at least a majority of the first particles, the first particles comprising silver-coated copper particles, the silver-coated copper particles comprising silver coatings comprising outermost major surfaces of the silver-coated copper particles and forming interfaces with copper cores of the silver-coated copper particles,
    a ratio of a total volume of the pluralities of the at least first and second particles to a total volume of the adhesive layer greater than about 40%, the at least first and second particles dispersed uniformly in the adhesive material such that for a majority of the first particles, the thickness direction of each first particle is substantially parallel to the thickness direction of the adhesive layer, and for a majority of the second particles, a maximum dimension of each second particle in the thickness direction of the adhesive layer is greater than about 5 H1.

2. The electrically conductive adhesive layer of claim 1, wherein the pluralities of electrically conductive at least first and second particles comprises a plurality of third particles, each third particle different from the first and second particles.

3. The electrically conductive adhesive layer of claim 1 being more electrically conductive in the thickness direction and less electrically conductive in an in-plane direction.

4. The electrically conductive adhesive layer of claim 1, wherein L1 and W1 are each greater than about 5 H1 for at least 75% of the first particles.

5. The electrically conductive adhesive layer of claim 1, wherein for at least 75% of the first particles, the thickness direction of each first particle is substantially parallel to the thickness direction of the adhesive layer.

6. The electrically conductive adhesive layer of claim 1, wherein for a majority of the second particles, the maximum dimension of each second particle in the thickness direction of the adhesive layer is greater than about 10 H1.

7. The electrically conductive adhesive layer of claim 1, wherein each second particle has a length L2, a width W2, and a thickness H2, L2/H2, W2/H2 and L2/W2 each in a range from about 0.1 to about 10 for at least a majority of the second particles.

8. The electrically conductive adhesive layer of claim 1, wherein for at least a majority of the first particles, each first particle is flake like or plate like.

9. The electrically conductive adhesive layer of claim 1, wherein for at least a majority of the second particles, each second particle is a dendritic particle.

10. The electrically conductive adhesive layer of claim 1, wherein the first particles are substantially two-dimensional particles and the second particles are substantially three-dimensional particles.

11. The electrically conductive adhesive layer of claim 1, wherein a ratio of a total weight of the first particles to a total weight of the second particles is in a range from about 0.1 to about 10.

12. The electrically conductive adhesive layer of claim 1 having a peel strength of at least 0.1 N/mm from a stainless steel surface after a dwell time of about 20 minutes at 22° C.

13. The electrically conductive adhesive layer of claim 1, wherein the adhesive material comprises one or more of a pressure sensitive adhesive, a hot melt adhesive, a thermoset adhesive, a thermoplastic adhesive, a UV adhesive, a liquid adhesive, a solvent based adhesive, and a water based adhesive.

14. The electrically conductive adhesive layer of claim 1, wherein the first particles have a cumulative 50% particle diameter D50 in a range from about 5 micrometers to about 50 micrometers.

15. The electrically conductive adhesive layer of claim 1, wherein the second particles have a cumulative 50% particle diameter D50 in a range from about 5 micrometers to about 50 micrometers.

16. An adhesive transfer tape comprising:
the electrically conductive adhesive layer of claim 1; and
a first release liner releasably attached to a first major surface of the adhesive layer.

* * * * *